(12) United States Patent
Matsuura (10) Patent No.: US 9,389,457 B2
(45) Date of Patent: Jul. 12, 2016

(54) LIGHT SOURCE APPARATUS

(71) Applicant: CANON KABUSHIKI KAISHA, Tokyo (JP)

(72) Inventor: Yasuhiro Matsuura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 14/273,293

(22) Filed: May 8, 2014

(65) Prior Publication Data

US 2014/0334144 A1  Nov. 13, 2014

(30) Foreign Application Priority Data

May 13, 2013 (JP) ................. 2013-101238

(51) Int. Cl.
*G02F 1/1335* (2006.01)
*F21Y 101/02* (2006.01)
*F21Y 105/00* (2016.01)

(52) U.S. Cl.
CPC ....... *G02F 1/133603* (2013.01); *F21Y 2101/02* (2013.01); *F21Y 2105/005* (2013.01); *G02F 2001/133613* (2013.01)

(58) Field of Classification Search
CPC .......... F21Y 2101/02; F21Y 2105/005; G02F 1/133603; G02F 2001/133613
See application file for complete search history.

(56) References Cited

U.S. PATENT DOCUMENTS 8,523,419 B2 * 9/2013 Nevitt ........................ 362/301

FOREIGN PATENT DOCUMENTS

JP   2008-003220 A   1/2008
JP   2008-034361 A   2/2008

* cited by examiner

*Primary Examiner* — Stephen F Husar
(74) *Attorney, Agent, or Firm* — Cowan, Liebowitz & Latman, P.C.

(57) ABSTRACT

A light source apparatus includes a plurality of light emission clusters arranged in a matrix pattern, wherein the light emission cluster has four sub light emission clusters of two rows and two columns, the sub light emission cluster has a plurality of light sources, the plurality of light sources having a first light source that emits light of a first color and a second light source that emits light of a second color, a difference in brightness of the second color being more easily perceived than a difference in brightness of the first color, and an interval between a center of the light emission cluster and the second light source of the light emission cluster is greater than or equal to an interval between the center of the light emission cluster and the first light source of the light emission cluster.

11 Claims, 6 Drawing Sheets

LIGHT SOURCE APPARATUS

BACKGROUND OF THE INVENTION

1. Field of the Invention

The present invention relates to a light source apparatus.

2. Description of the Related Art

Conventionally, cold cathode fluorescent lamps (CCFLs) have been used as the light sources of backlight apparatuses for liquid crystal display units. In recent years, however, backlight apparatuses using light emitting diodes (LEDs) as the light sources thereof have become widespread. From the standpoint that LEDs are point light sources, it is necessary to consider, when using the LEDs as the light sources of backlight apparatuses, the arrangement of the LEDs, the diffusion structure of light, the reflection structure of light, or the like to reduce brightness unevenness and color unevenness. Since brightness unevenness and color unevenness are easily caused in backlight apparatuses using LEDs of a plurality of colors such as red, green, and blue colors, consideration is particularly given to the arrangement of the LEDs, the diffusion structure of light, the reflection structure of light, or the like.

Technology to reduce color unevenness caused in a backlight apparatus using LEDs of the three colors of red, green, and blue colors, is disclosed in, for example, Japanese Patent Application Laid-open No. 2008-034361. In the technology disclosed in Japanese Patent Application Laid-open No. 2008-034361, a plurality of types of light emission clusters having the red LEDs thereof arranged in different positions is constituted as light emission clusters in which the LEDs of the three colors described above are arranged in a triangle. Further, the types of the light emission clusters arranged are changed according to the arrangement positions of the light emission clusters.

In addition, there is technology of using LEDs as point light sources and separately controlling the light emission brightness of the LEDs to partially change the brightness of backlight apparatuses and improve the contrast of display images. The control of light emission brightness as described above is generally called local dimming control. In the local dimming control, for each of a plurality of divided regions constituting a screen, the brightness value of an image signal is analyzed and the light emission brightness of corresponding light sources is controlled based on the analysis result of the brightness value. Thus, the contrast of a display image is improved. In addition, by the use of the light sources of a plurality of colors as light sources corresponding to the divided regions, not only the light emission brightness of a backlight apparatus but the colors to be emitted may be changed for each of the divided regions. Specifically, by the change of the ratio of the light emission brightness between the light sources of the plurality of colors, the colors to be emitted from the backlight apparatus may be changed. By the control of the colors to be emitted from the backlight apparatus for each of the divided regions, the color gamut of a display image may be expanded.

Technology to reduce color unevenness caused in a backlight apparatus capable of performing the local dimming control is disclosed in, for example, Japanese Patent Application Laid-open No. 2008-003220. Specifically, Japanese Patent Application Laid-open No. 2008-003220 discloses the technology to reduce color unevenness caused in an outer edge part. In the technology disclosed in Japanese Patent Application Laid-open No. 2008-003220, each of a plurality of light source units (light emission clusters) corresponding to a plurality of divided regions is constituted of a plurality of red, green, and blue LEDs. Further, for each of the light source units, the LEDs are arranged such that the centroid of brightness profiles based on the plurality of red LEDs, the centroid of brightness profiles based on the plurality of green LEDs, and the centroid of brightness profiles based on the plurality of blue LEDs substantially match the centroid of the light source unit.

SUMMARY OF THE INVENTION

However, when the local dimming control is performed by the backlight apparatus including the plurality of light emission clusters each having the LEDs of the plurality of colors, color unevenness is caused between the light emission clusters due to a difference in the light emission brightness between the light emission clusters. Specifically, when the light emission brightness between the light emission clusters is different, a difference in the light emission brightness between the light emission clusters on a specific color is perceived as color unevenness.

The technology disclosed in Japanese Patent Application Laid-open No. 2008-034361 is aimed at reducing color unevenness caused at the upper, lower, and corner parts of a screen when all the light emission clusters are caused to emit light with the same light emission brightness but does not consider color unevenness caused when the local dimming control is performed. In addition, the technology disclosed in Japanese Patent Application Laid-open No. 2008-003220 is aimed at reducing, rather than the color unevenness caused when the local dimming control is performed, color unevenness caused when the composition (color mixture) of the light emitted from the LEDs of the respective colors is different between central and outer edge parts. Therefore, even with the technology disclosed in Japanese Patent Application Laid-open No. 2008-034361 and Japanese Patent Application Laid-open No. 2008-003220, the color unevenness between the light emission clusters caused when the local dimming control is performed may not be reduced.

The present invention provides a light source apparatus capable of reducing the color unevenness between a plurality of light emission clusters caused when local dimming control is performed by the light source apparatus including the plurality of light emission clusters each having light sources of a plurality of colors.

The present invention in its first aspect provides a light source apparatus capable of controlling brightness of light emitted for each light emission cluster, the light source apparatus comprising:

a plurality of light emission clusters arranged in a matrix pattern, wherein the light emission cluster has four sub light emission clusters of two rows and two columns, the sub light emission cluster has a plurality of light sources, the plurality of light sources having a first light source that emits light of a first color and a second light source that emits light of a second color, a difference in brightness of the second color being more easily perceived than a difference in brightness of the first color, and an interval between a center of the light emission cluster and the second light source of the light emission cluster is greater than or equal to an interval between the center of the light emission cluster and the first light source of the light emission cluster.

The present invention in its second aspect provides a light source apparatus capable of controlling brightness of light emitted for each light emission cluster, the light source apparatus comprising:

a plurality of light emission clusters arranged in a matrix pattern, wherein the light emission cluster has a plurality of light sources, the plurality of light sources having a first light source that emits light of a first color and a second light source that emits light of a second color, a difference in brightness of the second color being more easily perceived than a difference in brightness of the first color, and an interval between the second light source of the light emission cluster and the second light source of the adjacent light emission cluster is smaller than an interval between the first light source of the light emission cluster and the first light source of the adjacent light emission cluster.

According to the present invention, the color unevenness between the light emission clusters caused when the local dimming control is performed by the light source apparatus including the plurality of light emission clusters each having the light sources of the plurality of colors can be reduced.

Further features of the present invention will become apparent from the following description of exemplary embodiments with reference to the attached drawings.

DESCRIPTION OF THE EMBODIMENTS

First Embodiment

Hereinafter, a description will be given of a light source apparatus according to a first embodiment of the present invention. The light source apparatus according to the embodiment is a light source apparatus capable of performing local dimming control. The light source apparatus according to the embodiment may be used as, for example, a backlight apparatus for a liquid crystal display unit.

Note that the light source apparatus according to the embodiment is not limited to a backlight apparatus. For example, the light source apparatus according to the embodiment may be used as the light source apparatus of a display unit (such as an advertisement sign unit and a sign display unit) that allows light to pass through to display an image. In addition, the light source apparatus according to the embodiment may be used as the light source apparatus of a unit other than a display unit such as indoor lighting and a street light.

Figure 1:
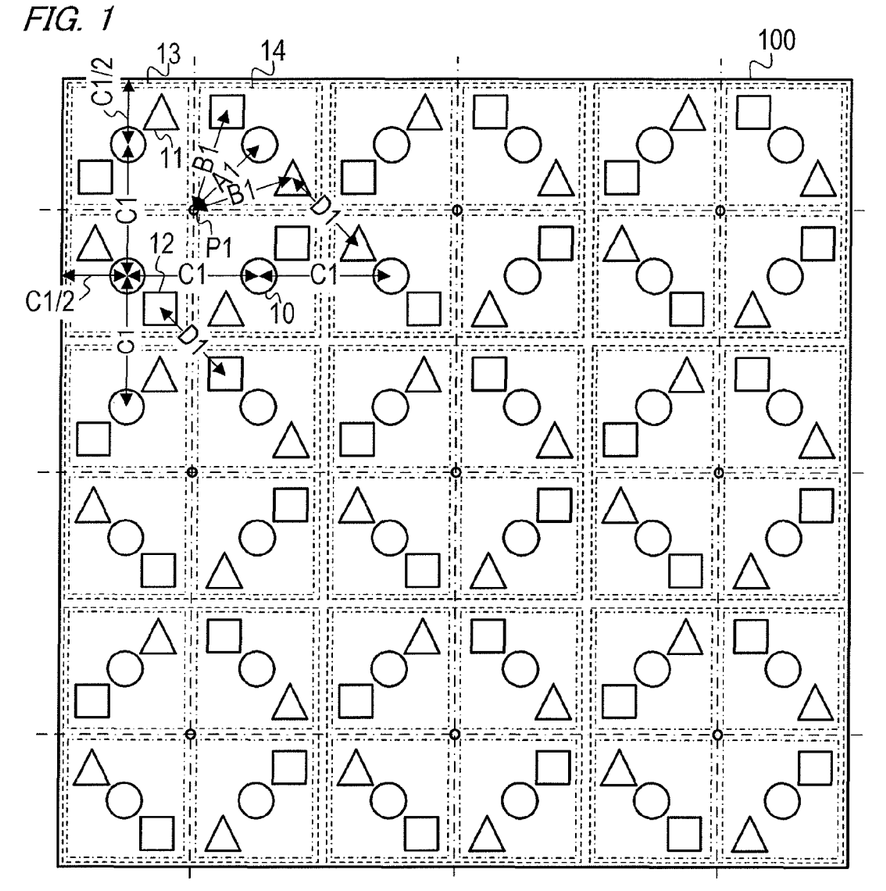
FIG. 1 is a diagram showing an example of the configuration of a light source apparatus according to a first embodiment.

FIG. 1 shows an example of the configuration of a light source apparatus 100 according to the embodiment.

As shown in FIG. 1, the light source apparatus 100 has a plurality of light emission clusters 13 arranged in a matrix pattern. In the example of FIG. 1, the light source apparatus 100 has the nine light emission clusters 13 of three rows and three columns.

Note that the plurality of light emission clusters 13 may or may not be separated from each other.

Note that the number of the light emission clusters is not limited to nine. The number of the light emission clusters may be greater or smaller than nine. For example, the plurality of light emission clusters may be four light emission clusters of two rows and two columns, 16 light emission clusters of four rows and four columns, or ten light emission clusters of two rows and five columns.

The light emission cluster 13 has a plurality of light sources including first light sources that emit the light of a first color and second light sources that emit the light of a second color, a difference in the brightness of the second color being more easily perceived than a difference in the brightness of the first color. Specifically, the light emission cluster 13 has green LEDs 10 (G light sources), red LEDs 11 (R light sources), and blue LEDs 12 (B light sources). The green LED 10 is a light source that emits the light of a green color, specifically light having a main wavelength range of 490 nm to 549 nm. The red LED 11 is a light source that emits the light of a red color, specifically light having a main wavelength range of greater than or equal to 611 nm. The blue LED 12 is a light source that emits the light of a blue color, specifically light having a main wavelength range of 430 nm to 490 nm. The CIE1976 UCS chromaticity diagram shows that a difference in the brightness of red and blue colors is more easily perceived than a difference in the brightness of a green color due to a human's color vision. Therefore, in the embodiment, the green color is the first color, the red color is the second color, the blue color is a third color, the green LED 10 is the first light source, the red LED 11 is the second light source, and the blue LED 12 is a third light source. In addition, the center of the light emission cluster 13 is described as P1 in the embodiment.

Note that the green color may be the first color, the red color may be the third color, the blue color may be the second color, the green LED 10 may be the first light source, the red LED 11 may be the third light source, and the blue LED 12 may be the second light source.

Note that the light sources are not limited to light emission diodes (LEDs). For example, the light sources may be organic EL devices or the like.

In the embodiment, the brightness of light to be emitted is controlled for each of the light emission clusters when the local dimming control is performed. In addition, in the embodiment, the light emission brightness of each of the plurality of light sources of the light emission cluster is controlled so as to emit the light of a predetermined color from the light emission cluster when the local dimming control is performed. Specifically, in order to emit the light of a white color from the light emission cluster, the light emission brightness of the first to third light sources is controlled such that the ratio between the light emission brightness of the first light source, the light emission brightness of the second light source, and the light emission brightness of the third light source is 7:3:1. In addition, in the embodiment, the color gamut of the light of the predetermined color may be more expanded by the use of the light sources of the plurality of colors compared with a case in which the light sources of a plain color are used. Specifically, the chromaticity point of the light of the predetermined color may be changed by the fine adjustment of the ratio of the light emission brightness between the first, second, and third light sources.

Note that the predetermined color is not limited to a white color.

When the light source apparatus 100 is a light source apparatus for a display unit, the plurality of light emission clusters 13 is provided so as to correspond to a plurality of divided regions constituting a screen. For example, the light emission clusters 13 are provided so as to apply light to corresponding divided regions (divided regions corresponding to the light emission clusters 13) on the back surface of a display panel. Specifically, the light emission clusters 13 are provided so as to make the centers P1 thereof align with the centers of the corresponding divided regions. The light emission clusters 13 are the same in size as the divided regions, and the divided regions and the light emission clusters 13 are formed into squares. When the screen has an aspect ratio of 16:9 in the horizontal direction and the vertical direction, respectively, the square divided regions are obtained in such a way that the screen is divided in the horizontal direction by a multiple of 16 and divided in the vertical direction by a multiple of nine. The number of the divided regions is determined according to, for example, a contrast required in the display unit.

Note that the light emission clusters 13 may be greater or smaller in size than the divided regions.

In addition, the divided regions and the light emission clusters 13 may not be necessarily formed into squares. For example, the light emission clusters 13 may be formed into quadrangles (such as rectangles, parallelograms, and trapezoids), circles, triangles, pentagons, or the like other than squares.

The light emission cluster 13 has four sub light emission clusters 14 of two rows and two columns. The sub light emission cluster 14 has the plurality of light sources (plurality of light sources including the first and second light sources) described above. Specifically, the sub light emission cluster 14 has the green LED 10, the red LED 11, and the blue LED 12.

Note that the four sub light emission clusters of the light emission cluster 13 may or may not be separated from each other.

Note that a reflection wall having high light reflectivity may be provided at the outer edge part (end) of the light source apparatus 100 to improve the brightness and the color mixture (composition (color mixture) of the light emitted from the first to third light sources) at the outer edge part. When the light source apparatus 100 is a light source apparatus for a display unit, the reflection wall may be provided only to surround the display region (screen region) of the display unit or a region including the display region (region wider than the display region).

A description will be given of the arrangement of the light sources in the light source apparatus according to the embodiment.

First, the arrangement of the green LEDs 10 serving as the first light sources will be described.

In the embodiment, the green LED 10 is arranged at the center of each of the sub light emission clusters 14. In the example of FIG. 1, the light emission region (region where light is to be emitted) of the light source apparatus 100 is formed into a square. The light emission region of the light emission cluster 13 is a square region obtained by evenly dividing the light emission region of the light source apparatus 100 into the regions of three rows and three columns. Further, the light emission region of the sub light emission cluster 14 is a square (square having a one-side length of C1) region obtained by evenly dividing the light emission region of the light emission cluster 13 into the regions of two rows and two columns. Accordingly, in the embodiment, the light source apparatus has the 36 sub light emission clusters 14 in total. Further, the green LED 10 is arranged in each of the sub light emission clusters 14 such that the interval of the green LEDs 10 in the horizontal (row) and vertical (column) directions is C1. As described above, the green LED 10 is a light source that emits the light of the highest brightness among the plurality of light sources (green, red, and blue LEDs) when the light of a white color is obtained from the light emission cluster. By the arrangement of such light sources (green LEDs) at the centers of the sub light emission clusters, brightness unevenness may be reduced when all the light emission clusters are caused to emit light with the same light emission brightness. In other words, by the arrangement of the green LEDs at even intervals, brightness unevenness may be reduced when all the light emission clusters are caused to emit light with the same light emission brightness.

Next, a description will be given of the arrangement of the red LEDs 11 serving as the second light sources and the blue LEDs 12 serving as the third light sources.

As described above, a difference in the brightness of the red and blue colors is more easily perceived than a difference in the brightness of the green color. Therefore, a difference in the light emission brightness of the red LEDs 11 between the light emission clusters adjacent to each other and a difference in the light emission brightness of the blue LEDs 12 between the light emission clusters adjacent to each other are easily perceived as color unevenness when the local dimming control is performed.

Therefore, in the embodiment, the red LEDs 11 are arranged such that that interval of the red LEDs 11 between the light emission clusters adjacent to each other become small. Thus, the color mixture between red light emitted from the red LED 11 of a light emission cluster and red light emitted from the red LED 11 of a light emission adjacent to the light emission cluster may be improved. As a result, a difference in the light emission brightness of the red LEDs 11 between the light emission clusters adjacent to each other is hardly perceived, and the color unevenness between the light emission clusters may be reduced.

Similarly, in the embodiment, the blue LEDs 12 are arranged such that the interval of the blue LEDs 12 between the light emission cluster adjacent to each other becomes small. Thus, the color mixture between blue light emitted from the blue LED 12 of the light emission cluster and blue light emitted from the blue LED 12 of the light emission cluster adjacent to the light emission cluster may be improved. As a result, a difference in the light emission brightness of the blue LEDs 12 between the light emission clusters adjacent to each other is hardly perceived, and the color unevenness between the light emission clusters may be reduced.

Note that the LEDs may be arranged such that the interval of the LEDs between the light emission clusters adjacent to each other becomes small only for the red LEDs 11 or the blue LEDs 12. When the LEDs are arranged such that the interval of the LEDs (LEDs that emit light whose difference is easily perceived) between the light emission clusters adjacent to each other becomes small, color unevenness due to a difference in the light emission brightness of the LEDs may be reduced.

The arrangement of the red LEDs 11 and the blue LEDs 12 will be described more in detail.

In the embodiment, the red LEDs 11 and the blue LEDs 12 are arranged so as to satisfy following Conditional Expressions 1 and 2. In Conditional Expressions 1 and 2, A1 represents the interval between the center P1 of the light emission cluster and the green LED 10 of the light emission cluster. B1 represents the interval between the center P1 of the light emission cluster and the red LED 11 of the light emission cluster and the interval between the center P1 of the light emission cluster and the blue LED 12 of the light emission cluster. C1 represents the interval of the green LEDs 10 between the light emission clusters adjacent to each other (interval of the green LEDs in the vertical and horizontal directions). D1 represents the interval of the red LEDs 11 between the light emission clusters adjacent to each other and the interval of the blue LEDs 12 between the light emission clusters adjacent to each other.

$$A1 \le B1 \quad \text{(Conditional Expression 1)}$$

$$D1 < C1 \quad \text{(Conditional Expression 2)}$$

Conditional Expression 1 expresses the condition that the intervals between the center of the light emission cluster and the red and blue LEDs of the light emission cluster are greater than or equal to the interval between the center of the light emission cluster and the green LED of the light emission cluster. Conditional Expression 2 expresses the condition that the interval of the green LEDs between the light emission clusters adjacent to each other is greater than the intervals of the red and blue LEDs between the light emission clusters adjacent to each other. By the arrangement of the LEDs to satisfy Conditional Expressions 1 and 2, the intervals of the red and blue LEDs 11 and 12 between the light emission clusters adjacent to each other may be smaller than the interval of the green LEDs 10 between the light emission clusters adjacent to each other, and thus the color unevenness between the light emission clusters may be reduced.

In the example of FIG. 1, the three LEDs (green, red, and blue LEDs) of the sub light emission cluster arranged in the second column of the first row among the four sub light emission clusters of the two rows and the two columns are arranged side by side in the direction of 45° relative to the horizontal direction. The three LEDs of the sub light emission cluster arranged in the first column of the second row are also arranged side by side in the direction of 45° relative to the horizontal direction. In addition, the three LEDs of the sub light emission cluster arranged in the first column of the first row and the three LEDs of the sub light emission cluster arranged in the second column of the second row are arranged side by side in the direction of 135° relative to the horizontal direction.

By such an arrangement of the LEDs, Conditional Expressions 1 and 2 are satisfied.

As described above, according to the embodiment, each of the light sources is arranged so as to satisfy above Conditional Expressions 1 and 2. Thus, the color unevenness between the light emission clusters caused when the local dimming control is performed by the light source apparatus including the plurality of light emission clusters each having the light sources of the plurality of colors may be reduced.

Figure 4:
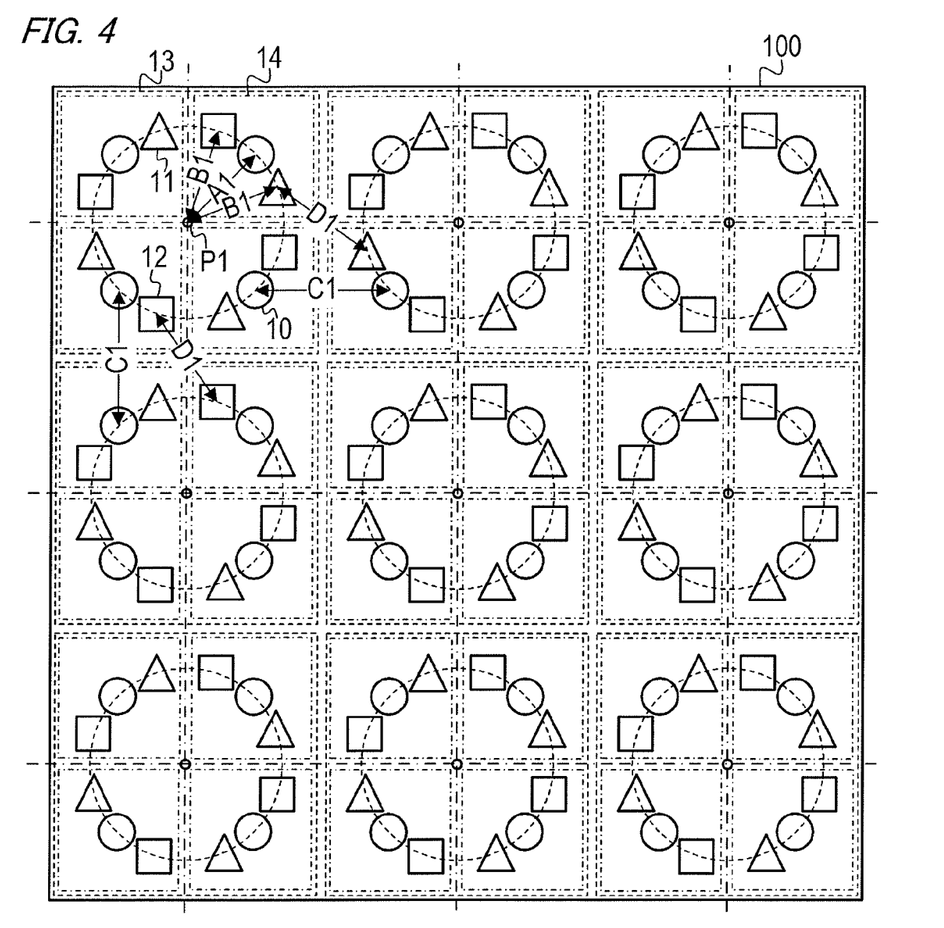
FIG. 4 is a diagram showing another example of the configuration of the light source apparatus according to the first embodiment.

Note that FIG. 1 shows an example of a case in which A1<B1 is established. However, as seen in Conditional Expression 1, A1=B1 may also be established. FIG. 4 shows an example of a case in which A1=B1 is established. Since Conditional Expressions 1 and 2 are satisfied also in the example of FIG. 4, the color unevenness between the light emission clusters may be reduced.

Note that when Conditional Expression 2 is satisfied, the interval of the red LEDs 11 between the light emission clusters adjacent to each other and the interval of the blue LEDs 12 between the light emission clusters adjacent to each other may be reduced. As a result, the color unevenness between the light emission clusters may be reduced. Therefore, each of the light sources may be arranged so as to satisfy only Conditional Expression 2. In addition, compared with a case in which the arrangement does not satisfy Conditional Expression 1, the arrangement satisfying Conditional Expression 1 may further reduce the interval of the red LEDs between the light emission clusters adjacent to each other and the interval of the blue LEDs between the light emission clusters adjacent to each other. As a result, the color unevenness between the light emission clusters may be reduced. Therefore, each of the light sources may be arranged so as to satisfy only Conditional Expression 1.

Figure 5:
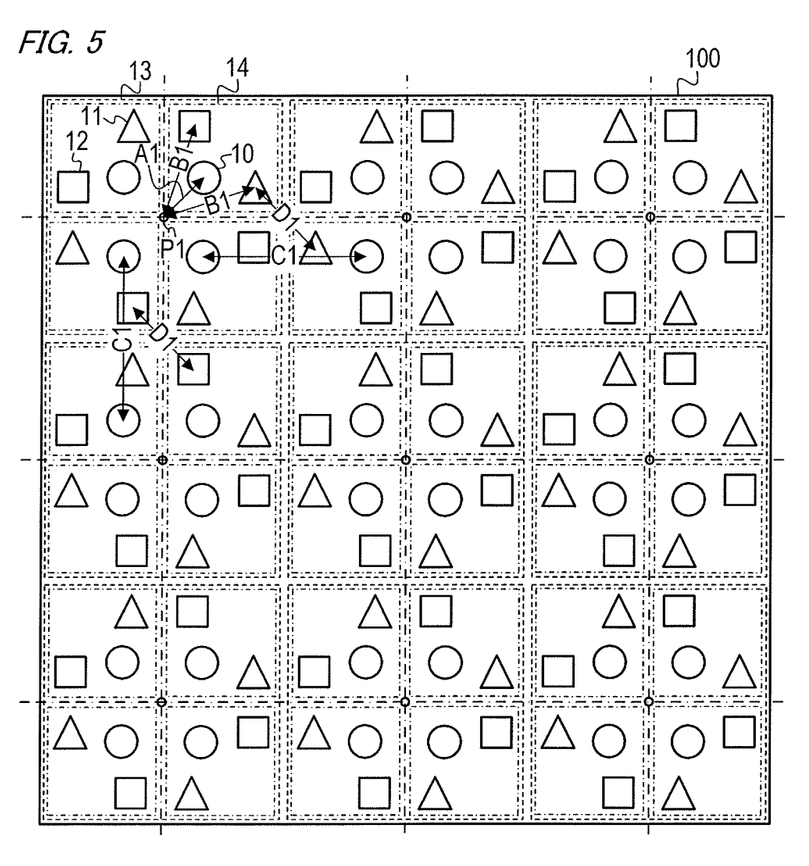
FIG. 5 is a diagram showing another example of the configuration of the light source apparatus according to the first embodiment.

FIG. 5 shows an example of a case in which Conditional Expressions 1 and 2 are satisfied. As seen in FIG. 5, the green LEDs may not be arranged at the centers of the sub light emission clusters.

Figure 6:
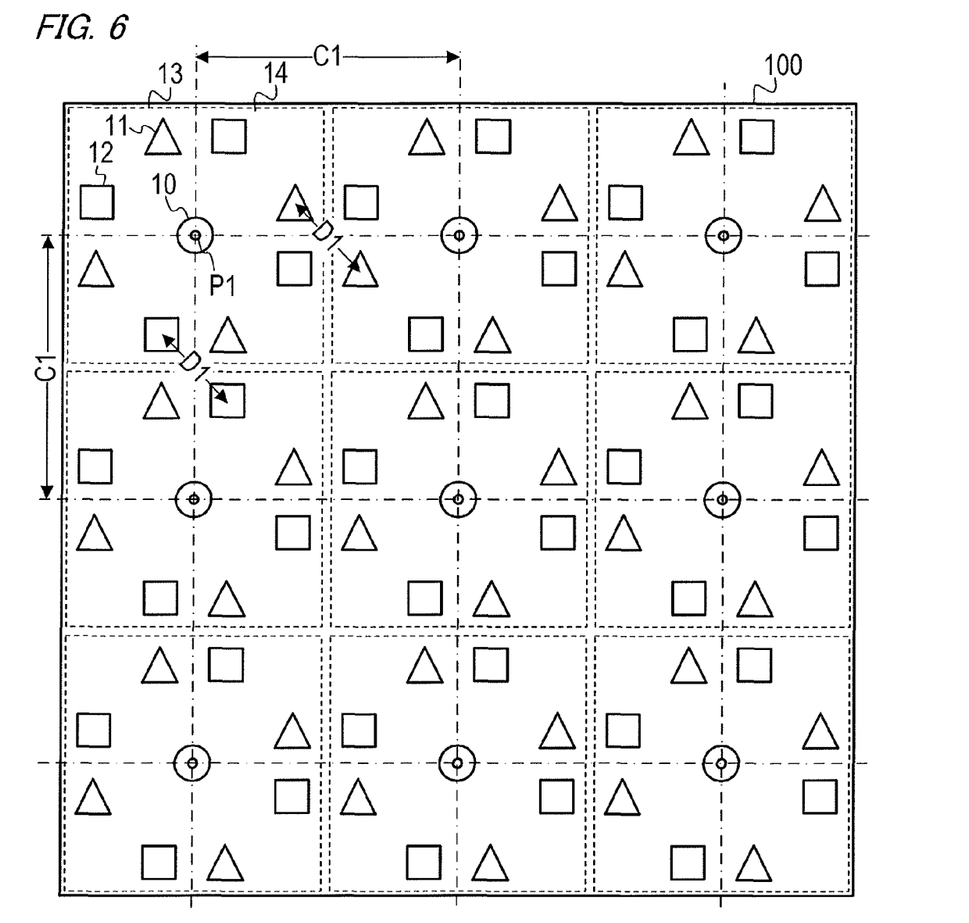
FIG. 6 is a diagram showing another example of the configuration of the light source apparatus according to the first embodiment.

Note that although FIG. 1 shows an example of a case in which the light emission cluster have the four sub light emission clusters of the two rows and the two columns, the light emission cluster may not have the sub light emission clusters. FIG. 6 shows an example of a case in which the light emission cluster does not have the sub light emission clusters. Since Conditional Expression 2 is satisfied also in the example of FIG. 6, the color unevenness between the light emission clusters may be reduced.

Note that the interval between the center of the light emission cluster and the red LED of the light emission cluster and the interval between the center of the light emission cluster and the blue LED of the light emission cluster may be different from each other. In addition, the interval of the red LEDs between the light emission clusters adjacent to each other and the interval of the blue LEDs between the light emission clusters adjacent to each other may be different from each other. With such a configuration, the color unevenness between the light emission clusters may be reduced when Conditional Expression 1, Conditional Expression 2, or both of them are satisfied.

Second Embodiment

Hereinafter, a description will be given of a light source apparatus according to a second embodiment of the present invention. The first embodiment describes the configuration in which the three types of the light sources of the green, red, and blue LEDs are used. The embodiment will describe a configuration in which two types of light sources are used. Specifically, the description will be given of the configuration in which cyan LEDs (C light sources) serving as light sources that emit the light of a cyan color and red LEDs (R light sources) serving as light sources that emit the light of a red color are used. A difference in the brightness of the red color is more easily perceived than a difference in the brightness of the cyan color. Therefore, in the embodiment, the cyan color is a first color, the red color is a second color, the cyan LED is a first light source, and the red LED is a second light source.

Note that the two types of the light sources are not limited to the C light source and the R light source. For example, the two types of the light sources may include a G light source that emits the light of a green color and an M light source that emits the light of a magenta color. In this case, the green color is the first color, the magenta color is the second color, the G light source is the first light source, and the M light source is the second light source.

Figure 2:
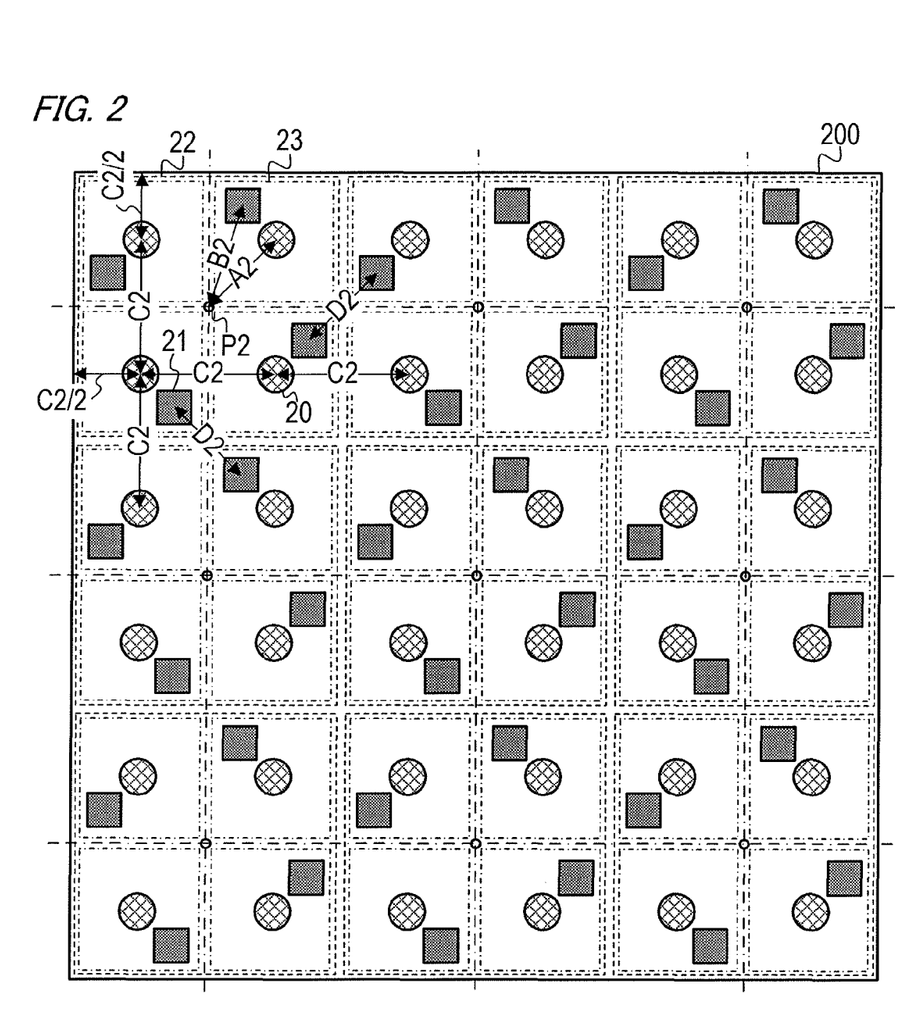
FIG. 2 is a diagram showing an example of the configuration of a light source apparatus according to a second embodiment.

FIG. 2 shows an example of the configuration of a light source apparatus 200 according to the embodiment.

Like the first embodiment (FIG. 1), the light source apparatus 200 has a plurality of light emission clusters 22 arranged in a matrix pattern. In the example of FIG. 2, the light source apparatus 200 has the nine light emission clusters 22 of three rows and three columns. The brightness of light to be emitted is controlled for each of the light emission clusters 22 when local dimming control is performed.

Figure 3:
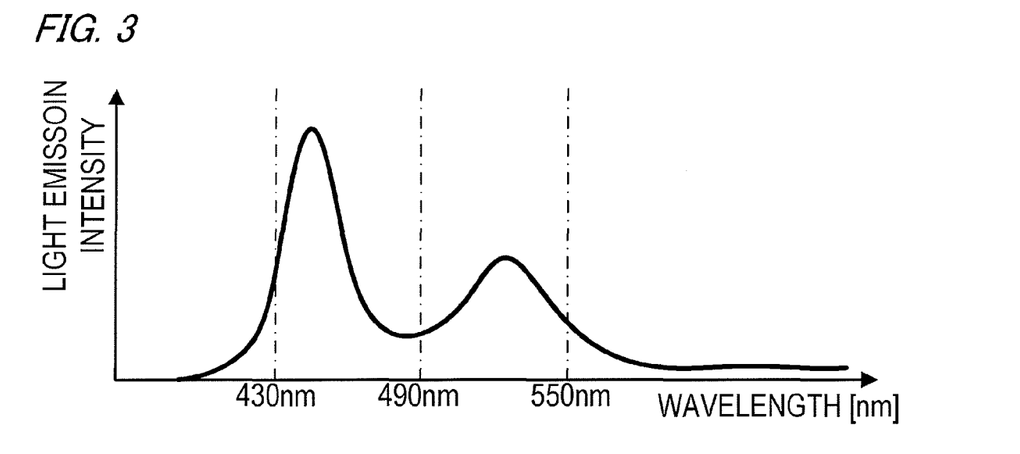
FIG. 3 is a graph showing an example of the spectral characteristics of a cyan LED according to the second embodiment.

Like the first embodiment (FIG. 1), the light emission cluster 22 has four sub light emission clusters 23 of two rows and two columns. The sub light emission cluster 23 has a cyan LED 20 and a red LED 21. The cyan LED 20 is a light source that emits the light of the cyan color, specifically light obtained by exciting light having a main wavelength range of 430 nm to 490 nm with a green fluorescent material. The light emitted from the cyan LED 20 has spectral characteristics as shown in, for example, FIG. 3. That is, the spectral characteristics of the light emitted from the cyan LED 20 have, for example, two peaks. In FIG. 3, the horizontal axis shows a wavelength, and the vertical axis shows light emission intensity. The red LED 21 is a light source that emits the light of the red color, specifically light having a main wavelength range of greater than or equal to 611 nm.

A description will be given of the arrangement of the light sources in the light source apparatus according to the embodiment.

First, the arrangement of the cyan LEDs 20 serving as the first light sources will be described.

In the embodiment, the cyan LED 20 is arranged at the center of each of the sub light emission clusters 23. In the example of FIG. 2, the light emission region of the light source apparatus 200 is formed into a square. The light emission region of the light emission cluster 22 is a square region obtained by evenly dividing the light emission region of the light source apparatus 200 into the regions of three rows and three columns. Further, the light emission region of the sub light emission cluster 23 is a square (square having a one-side length of C2) region obtained by evenly dividing the light emission region of the light emission cluster 22 into the regions of two rows and two columns. Accordingly, in the embodiment, the light source apparatus has the 36 sub light emission clusters 23 in total. Further, the cyan LED 20 is arranged in each of the sub light emission clusters 23 such that the interval of the cyan LEDs 20 in the horizontal (row) and vertical (column) directions is C2. The cyan LED 20 is a light source that emits the light of brightness higher than that of the red LED 21 when the light of a white color is obtained from the light emission cluster. By the arrangement of such light sources (cyan LEDs) at the centers of the sub light emission clusters, brightness unevenness may be reduced when all the light emission clusters are caused to emit light with the same light emission brightness. In other words, by the arrangement of the cyan LEDs at even intervals, brightness unevenness may be reduced when all the light emission clusters are caused to emit light with the same light emission brightness.

Next, a description will be given of the arrangement of the red LEDs 21 serving as the second light sources.

As described above, a difference in the brightness of the red color is more easily perceived than a difference in the brightness of the cyan color. Therefore, a difference in the light emission brightness of the red LEDs 21 between the light emission clusters adjacent to each other is easily perceived as color unevenness when the local dimming control is performed.

Therefore, in the embodiment, the red LEDs 21 are arranged such that the interval of the red LEDs 21 between the light emission clusters adjacent to each other becomes small. As a result, a difference in the light emission brightness of the red LEDs 21 between the light emission clusters adjacent to each other is hardly perceived, and the color unevenness between the light emission clusters may be reduced.

The arrangement of the red LEDs 21 will be described more in detail.

In the embodiment, the red LEDs 21 are arranged so as to satisfy following Conditional Expressions 3 and 4. In Conditional Expressions 3 and 4, A2 represents the interval between a center P2 of the light emission cluster and the cyan LED 20 of the light emission cluster. B2 represents the interval between the center P2 of the light emission cluster and the red LED 21 of the light emission cluster. C2 represents the interval of the cyan LEDs 20 between the light emission clusters adjacent to each other (interval of the cyan LEDs 20 in the vertical and horizontal directions). D2 represents the interval of the red LEDs 21 between the light emission clusters adjacent to each other.

$$A2 \leq B2 \quad \text{(Conditional Expression 3)}$$

$$D2 < C2 \quad \text{(Conditional Expression 4)}$$

That is, in the embodiment, each of the light sources is arranged such that the interval B2 becomes greater than or equal to the interval A2 and the interval D2 becomes smaller than the interval C2. By such an arrangement of the LEDs, the interval of the red LEDs 21 between the light emission clusters adjacent to each other may be smaller than the interval of the cyan LEDs 20 between the light emission clusters adjacent to each other, and thus the color unevenness between the light emission clusters may be reduced.

In the example of FIG. 2, the two LEDs (cyan LED and red LED) of the sub light emission cluster arranged in the second column of the first row among the four sub light emission clusters of the two rows and the two columns are arranged side by side in the direction of 45° relative to the horizontal direction. The two LEDs of the sub light emission cluster arranged in the first column of the second row are also arranged side by side in the direction of 45° relative to the horizontal direction. In addition, the two LEDs of the sub light emission cluster arranged in the first column of the first row and the two LEDs of the sub light emission cluster arranged in the second column of the second row are arranged side by side in the direction of 135° relative to the horizontal direction.

By such an arrangement of the LEDs, Conditional Expressions 3 and 4 are satisfied.

As described above, according to the embodiment, each of the light sources is arranged so as to satisfy above Conditional Expressions 3 and 4. Thus, the color unevenness between the light emission clusters caused when the local dimming control is performed by the light source apparatus including the plurality of light emission clusters each having the light sources of the plurality of colors may be reduced.

Note that like the first embodiment (FIGS. 4 to 6), the configuration of the light source apparatus according to the embodiment may also be modified in various ways.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-101238, filed on May 13, 2013, which is hereby incorporated by reference herein in its entirety.

What is claimed is:

1. A light source apparatus capable of controlling brightness of light emitted for each light emission cluster, the light source apparatus comprising:

a plurality of light emission clusters arranged in a matrix pattern, wherein the light emission cluster has four sub light emission clusters of two rows and two columns, the sub light emission cluster has a plurality of light sources, the plurality of light sources having a first light source that emits light of a first color, a second light source that emits light of a second color, and a third light source that emits light of a third color, a difference in brightness of the second and third colors being more easily perceived than a difference in brightness of the first color, and an interval between a center of the light emission cluster and the second light source of the light emission cluster and an interval between the center of the light emission cluster and the third light source of the light emission cluster is greater than or equal to an interval between the center of the light emission cluster and the first light source of the light emission cluster.

2. The light source apparatus according to claim 1, wherein an interval of the second light source between light emission clusters adjacent to each other and an interval of the third light source between the light emission clusters adjacent to each other is smaller than an interval of the first light source of between the light emission clusters adjacent to each other.

3. The light source apparatus according to claim 1, wherein
light emission brightness of each of the plurality of light sources is controlled so as to emit light of a predetermined color from the light emission cluster,
the first light source is a light source that emits the light of a highest brightness among the plurality of light sources, and
the first light source is arranged at a center of the sub light emission cluster.

4. The light source apparatus according to claim 1, wherein
the plurality of light sources includes an R light source that emits light of a red color, a G light source that emits light of a green color, and a B light source that emits light of a blue color,
the first light source is the G light source,
the second light source is the R light source, and
the third light source is the B light source.

5. The light source apparatus according to claim 1, wherein
the first and second light sources of the sub light emission cluster arranged in a second column of a first row and the first and second light sources of the sub light emission cluster arranged in a first column of a second row among the four sub light emission clusters are arranged side by side in a direction of 45° relative to a horizontal direction, and
the first and second light sources of the sub light emission cluster arranged in the first column of the first row and the first and second light sources of the sub light emission cluster arranged in the second column of the second row among the four sub light emission clusters are arranged side by side in a direction of 135° relative to the horizontal direction.

6. The light source apparatus according to claim 1, wherein the plurality of light sources are arranged in a straight line.

7. A light source apparatus capable of controlling brightness of light emitted for each light emission cluster,
the light source apparatus comprising:
a plurality of light emission clusters arranged in a matrix pattern, wherein
the light emission cluster has a plurality of light sources, the plurality of light sources having a first light source that emits light of a first color, a second light source that emits light of a second color, and a third light source that emits light of a third color, a difference in brightness of the second and third colors being more easily perceived than a difference in brightness of the first color, and
an interval of the second light source between light emission clusters adjacent to each other and an interval of the third light source between the light emission clusters adjacent to each other is smaller than an interval of the first light source between the light emission clusters adjacent to each other.

8. The light source apparatus according to claim 7, wherein
the light emission cluster has four sub light emission clusters of two rows and two columns,
the sub light emission cluster has the plurality of light sources,
light emission brightness of each of the plurality of light sources is controlled so as to emit light of a predetermined color from the light emission cluster,
the first light source is a light source that emits the light of a highest brightness among the plurality of light sources, and
the first light source is arranged at a center of the sub light emission cluster.

9. The light source apparatus according to claim 7, wherein
the plurality of light sources includes an R light source that emits light of a red color, a G light source that emits light of a green color, and a B light source that emits light of a blue color,
the first light source is the G light source,
the second light source is the R light source, and
the third light source is the B light source.

10. The light source apparatus according to claim 7, wherein
the light emission cluster has four sub light emission clusters of two rows and two columns,
the sub light emission cluster has the plurality of light sources,
the first and second light sources of the sub light emission cluster arranged in a second column of a first row and the first and second light sources of the sub light emission cluster arranged in a first column of a second row among the four sub light emission clusters are arranged side by side in a direction of 45° relative to a horizontal direction, and
the first and second light sources of the sub light emission cluster arranged in the first column of the first row and the first and second light sources of the sub light emission cluster arranged in the second column of the second row among the four sub light emission clusters are arranged side by side in a direction of 135° relative to the horizontal direction.

11. The light source apparatus according to claim 7, wherein
the light emission cluster has four sub light emission clusters of two rows and two columns,
the sub light emission cluster has the plurality of light sources, and
the plurality of light sources are arranged in a straight line.

* * * * *